United States Patent [19]
Dabby

[11] Patent Number: 5,175,785
[45] Date of Patent: Dec. 29, 1992

[54] OPTICAL WAVEGUIDES HAVING REDUCED BENDING LOSS AND METHOD OF MAKING THE SAME

[75] Inventor: Franklin W. Dabby, Los Angeles, Calif.

[73] Assignee: Ensign-Bickford Optical Technologies, Inc., Van Nuys, Calif.

[21] Appl. No.: 694,652

[22] Filed: May 2, 1991

[51] Int. Cl.$^5$ .......................... G02B 6/02; C03C 25/02
[52] U.S. Cl. .................................... 385/123; 385/141; 385/140; 65/3.11; 65/3.12
[58] Field of Search ............... 350/96.29, 96.30, 96.31, 350/96.33, 96.34, 320; 65/3.11, 3.12; 385/27, 28, 29, 123, 126, 127, 142, 141, 144, 147, 140

[56] References Cited

U.S. PATENT DOCUMENTS

| | | | |
|---|---|---|---|
| 4,204,745 | 5/1980 | Sakai et al. | 385/124 |
| 4,770,494 | 9/1988 | Csencsits et al. | 385/142 |
| 4,838,643 | 6/1989 | Hodges et al. | 385/127 |
| 4,877,304 | 10/1989 | Bhagavatula | 385/124 |
| 4,973,169 | 11/1990 | Slonecker | 385/1 X |
| 5,032,001 | 7/1991 | Shang | 385/124 |

Primary Examiner—Brian Healy
Attorney, Agent, or Firm—Merchant, Gould, Smith, Edell, Welter & Schmidt

[57] ABSTRACT

An optical waveguide that has low (0.16 to 0.28 db/km) attenuation but can be subjected to sharp radii of curvature of the order of 2 mm has an index of refraction difference between core and cladding of less than 0.75% and a cutoff wavelength that is 50 micrometers or more greater than the operating wavelength. The waveguide is a "virtual single mode" device, because even though a second order mode can be sustained in the waveguide, the waveguide length or bending losses, or both, differentially attenuates the second order mode so that the primary mode strongly predominates and both modal noise and attenuation are within acceptable limits.

15 Claims, 8 Drawing Sheets

OPTICAL WAVEGUIDES HAVING REDUCED BENDING LOSS AND METHOD OF MAKING THE SAME

BACKGROUND OF THE INVENTION

This invention relates to low transmission loss optical waveguides, and more particularly to optical waveguides which have excellent signal transmission properties despite the presence of sharp or multiple lesser bends along the length of the waveguide.

Because of their small size and extremely low signal attenuation characteristics, optical waveguides, which are also referred to as optical fibers for telecommunication applications, are now supplanting coaxial cables and other wide band transmission lines. Optical waveguides are being used not only in telecommunications systems but in high capacity data processing systems, sensor systems and other communications environments as well. A succession of efforts and developments has constantly reduced attenuation losses to levels in the range of 0.16 to 0.28 db/km, with results as low as 0.12 db/km being reported. Optical waveguides for telecommunications are most often constructed to operate in single mode fashion, with the lowest loss wavelength generally being in the range of 1.55 micrometers. This wavelength is in the center of the band in which lowest attenuation is achieved for silica-based fibers. At these. levels of attenuation, extremely long lengths of waveguide can be used between transmitting and receiving units, without intermediate repeaters or amplifiers being employed.

There are, however, certain physical restraints on the ways in which optical waveguides can be used, and an important one of these pertains to the bending which can be tolerated in the waveguide. Signal losses of substantial level can be introduced either because the length of the fiber is turned about a point with a relatively small radius of curvature, or by waviness, called microbending, introduced because of the sheath of the fiber, the way the fiber is wound, or some other mechanical factor. In very general terms, the energy transmitted along an optical waveguide is, as is well known, concentrated about the core and theoretically must maintain wavefront planarity throughout the length of the propagating path. However, viewed in this very general way, it can be seen that a planar wavefront which must propagate through a bend has different path lengths between the center of the core and the outer radius. Since the velocity of light is determined by the media itself, a differential in path length is introduced, and energy losses result because energy is radiated out the side of the waveguide. These losses are dependent upon the extent of the bending that is introduced, i.e., the sharpness of the radius of curvature for pure bending and the number of microbends along the line.

This general description of the effects of bending is much more precisely analyzed in the book entitled "Single-Mode Fiber Optics", 2nd ed., by Luc B. Jeunhomme, Marcel Dekker, Inc., New York & Basel, 1990, pp. 103–115. It is pointed out therein that the difference in phase velocities between plane waves in a core and cladding, which arise at curved path regions, are resisted by the radiation of power away from the guide. Detailed equations are given for qualitative evaluations, there are both bending losses and transition losses, the transition losses following after a bent region when the waveguide returns to a linear path. Jeunhomme gives one equation, on page 106, for the critical radius of curvature $R_c$ at which bending loss "increases from sharply from negligible values to intolerably high values." This is delineated as:

$$R_c = 20 \, \lambda \Delta n^{-3/2} (2.748 - 0.996 \, \lambda/\lambda_c)^{-3} \qquad \text{(Equation 1)}$$

In this equation, $\Delta n$ is the difference in index of refraction in percent, between core and cladding, $\lambda$ is the operating wavelength and $\lambda_c$ is the cutoff wavelength. The cutoff wavelength for a single mode fiber is theoretically predetermined by a geometry and dopant level. In the prior art the approach has been to place the cutoff wavelength below or close to the operating wavelength so as to operate only in single mode and to accept the inherent limitation of bending radius or to increase the difference in index of refraction between core and cladding. This approach reduces the bending loss by further concentrating the field about the core but increases attenuation because of the higher dopant level needed for the higher index differential, higher doping levels having higher attenuation.

There are a substantial number of situations, however, in which it is highly desirable, and even necessary, to have low attenuation loss over a long transmission path which contains a sharp curve or repeatedly deviates from linearity, or is subject to both types of variations. Thus in CATV and computer networks it is often not feasible conveniently to maintain large curvatures and gradual transitions in coupling a source to one or many receivers. A more extreme example is presented by transmission systems in which dynamic changes of curvature may take place. For example, when laying an extremely long length of optical waveguide cable, one would like to be able to monitor transmissions on at least one waveguide during payout. Thus one can determine more precisely when signal amplification might be needed, or identify failures and problems so that corrective action can be taken. Even more stringent requirements are imposed by in a wholly different application, known as tethered vehicle payout systems. In these systems, an optical waveguide is wound concentrically about a longitudinal axis on a bobbin, the turns of the waveguide being lightly adhered to each other. The waveguide is anchored on a stationary receiver and pulled or "peeled" off the bobbin, which is attached to a moving vehicle which moves at least approximately along the longitudinal axis. A video or other signal thus can be fed back from the moving vehicle to the receiver via the waveguide. While the radius of curvature of waveguide wrapped around the bobbin may be relatively small, the radius of curvature is much smaller (of the order of 2 mm or less) at the "peel off" point where the waveguide separates from the bobbin. Given this practical operating requirement, the only resolution of the problem heretofore has been to increase the differential in the indices of refraction between the core and the cladding, and to accept the consequent signal attenuation. Obviously, this has an effect on system performance and reliability that is not desirable.

SUMMARY OF THE INVENTION

Optical waveguides in accordance with the invention provide low attenuation (0.16 to 0.28 db/km) while being relatively insensitive to bending losses through the use of core/cladding configurations which can support dual mode or multi-mode operation. However, the waveguide compensates for secondary modes by attenuating them to a level at which modal noise is within an acceptable range, thus providing what may be called "virtual single mode" operation. In waveguides in accordance with the invention, for example, the differential in the index of refraction between core and cladding is sufficiently low for attenuation to be in an acceptable range, but the core size is adequately large for the cutoff wavelength to be substantially higher than the operating wavelength. Thus at least dual modes can be propagated in such fiber waveguides. However, the second order and any higher modes have transversely spread fields which are differentially attenuated by the bends relative to the primary mode. Over a practical length of transmission path, with the accompanying bends, the primary mode substantially predominates at the receiver, so that modal noise and signal to noise ratios are within acceptable limits.

The preferred examples in accordance with the invention, the difference $\Delta n$ between core and cladding is less than 1.0% and the core/cladding relationship is sized such that dual mode propagation exists. This may be achieved either with a pure silica core with a fluosilicate cladding, or with a doped silica core with pure silica cladding. At wavelengths of about 1.55 micrometers the attenuation of the second order mode is several orders of magnitude greater than the primary mode. A further feature of the invention is that the fiber may be made with a multiple step index profile in which not only the core but an outer region of the cladding are of increased index of refraction. The primary mode, concentrated in the region of the core and cladding near the core, is unaffected by the higher index in the outer radius of the cladding, but the second order mode is more sharply "sucked" out by the higher index region of the outer portion of the cladding, thus further reducing modal noise.

In methods in accordance with the invention, a soot preform is first fabricated, using angled deposition to build up the core in the axial direction, followed by radially directed and reciprocating deposition of cladding along the length of the core body. In the preform buildup, the desired core dimension relative to the cladding and the desired index relationships are controlled in predetermined fashion. Thus, when the preform is drawn into an optical waveguide fiber of the desired diameter, and the fiber is drawn to a sufficient length to insure higher mode attenuation, giving the bending that is to be introduced, the desired "virtual single mode" operation is achieved.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
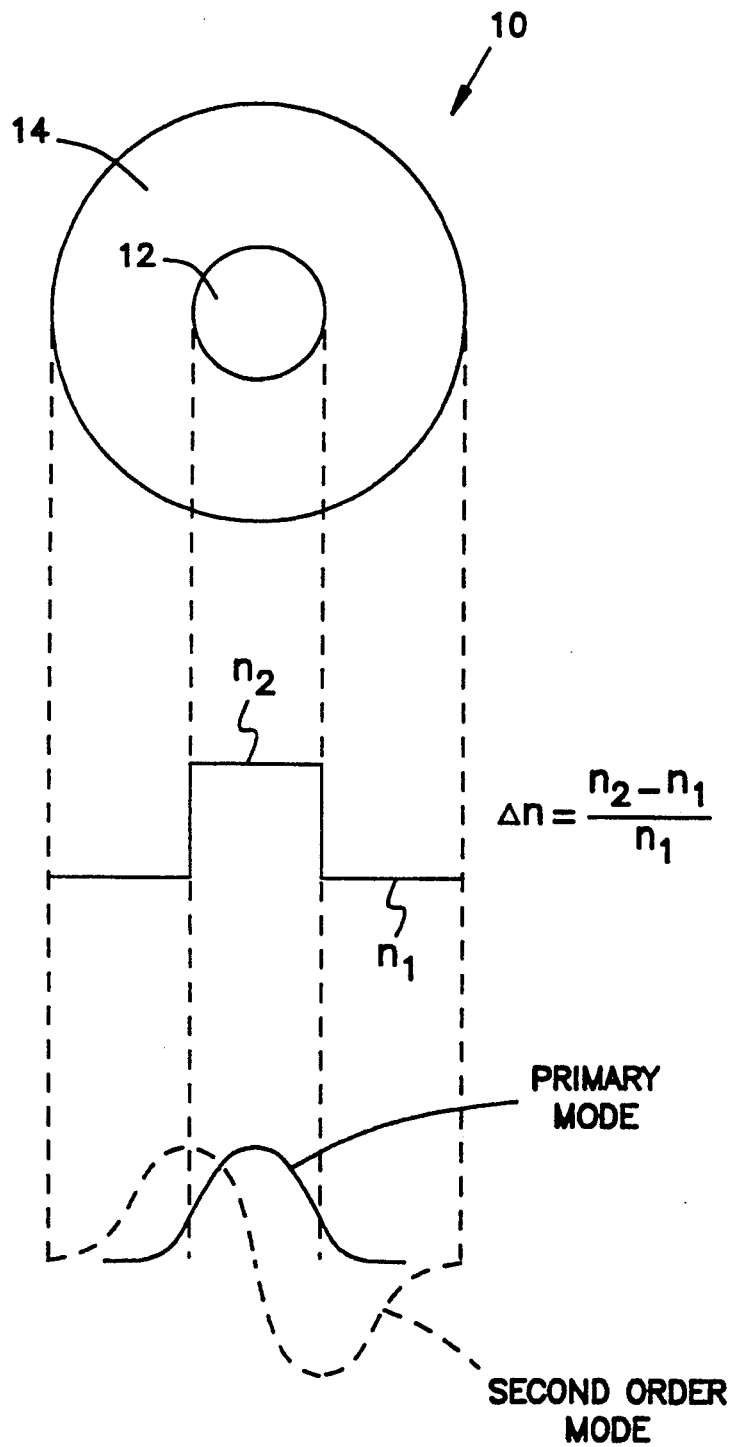
FIG. 1 depicts the cross section of an optical waveguide in accordance with the invention, showing index of refraction variations with radius throughout the waveguide, and field distributions in the waveguide for the primary and second order modes.

Referring now to FIG. 1, an example is shown of an optical waveguide 10 in accordance with the invention for reduced bending losses, in which the optical waveguide 10 has a core 12 within an exterior cladding 14. The core 12 can be seen to be defined, in the lower half of the Figure, by a step variation in the index of refraction, relative to the cladding 14. In accordance with the present invention, this difference is less than about 1.0%, typically 0.75% or less. The cutoff wavelength, $\lambda_c$, is primarily determined by the radial dimension of the core 12 relative to the cladding 14. For an optical waveguide to operate in the 1.55 micrometer (1550 nanometers) region, the cutoff wavelength in accordance with the prior art is typically below 1.55 micrometers. However, in accordance with the present invention, and with the lowered value of dopant, the cutoff wavelength $\lambda_c$ is held above the operating wavelength $\lambda$, by making a core having a diameter of in excess of 6 micrometers. While a cutoff wavelength $\lambda_c$ that is substantially greater may alternatively be employed, a cutoff wavelength $\lambda_c$ in the range of 1.6 nm to about 2.1 nm suffices to create a dual mode propagating structure. Usually a cutoff wavelength of between 30 nm to 550 nm wavelength is advantageously employed. Consequently, as seen in the lower half of FIG. 1, there can exist, in the waveguide 10, both the primary mode of propagation, the field of which is concentrated in the core 12 region, and also a secondary mode of propagation. The field of the second order mode is in the general form of a single sinusoid that extends well into the outer regions of the cladding 14.

Figure 6:
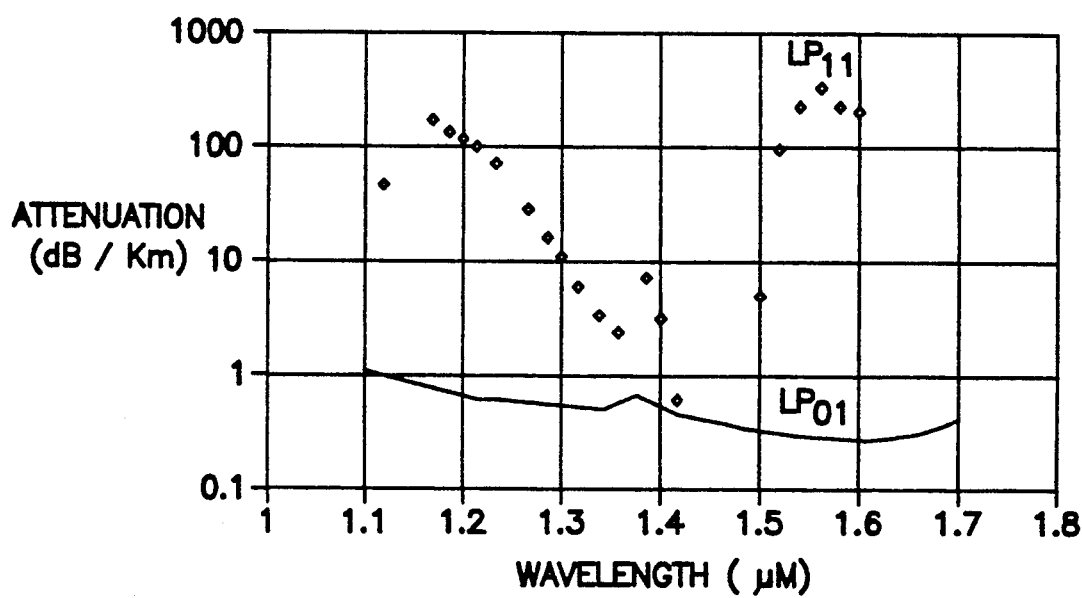
FIG. 6 is a graph of attenuation versus wavelength comparing single mode attenuation to second order mode attenuation.

Of itself, this configuration can both theoretically and in fact support both primary and secondary modes in short length test specimens. In test specimen lengths the modes propagate with some phase differential along the length of the transmission line and introduce interfering signal components at the signal receiver or detector, giving rise to modal noise. However, the second order mode energy is not as efficiently propagated, and thus is more sharply attenuated than is the primary mode. As seen in FIG. 1, the electric field in the primary $LP_{01}$ mode has a Gaussian distribution, with the peak of the wave energy concentrated in the region of the core 12 and decreasing to a skirt region in which energy tapers to zero in adjacent region of the cladding 14. The field of the second mode has a midpoint which passes through zero in the approximate center region of the core 12. Oppositely disposed positive-going and negative-going peaks adjacent this midregion are shifted somewhat toward the core 12 center, but substantial energy is confined i- the cladding 14. Wave energy in the second mode is not as efficiently propagated as that in the primary mode because it is inconsistent with established theory as to optical waveguides in supporting substantial energy in two dissimilar index regions. This is borne out in FIG. 6, where it is shown that test results establish that at 1.55 micrometers the $LP_{11}$ mode attenuation is orders of magnitude greater than the $LP_{01}$ mode. Over a practical waveguide length of 9000 meters or more this differential attenuation brings the second mode energy losses down to a level at which modal noise is at an acceptably low level. In addition, bending losses affect the second order mode more than the primary mode in tending to radiate more energy outwardly as lost power. The combination of the two factors in any particular exemplification is what determines whether the primary mode strongly predominates.

It can be seen, therefore, that a balance is established between the amount of dopant in the core and the radial size of the core to permit the initial existence of a second order mode, but that the energy in this mode is sufficiently diminished under practical conditions to provide what may be called "virtual single mode" operation. The same principle is applicable where more than two modes can be established, as in an oligomode waveguide. However, as is evident from test results discussed below, the essential objectives are obtained by establishing the "balanced dual mode" conditions.

Figure 2:
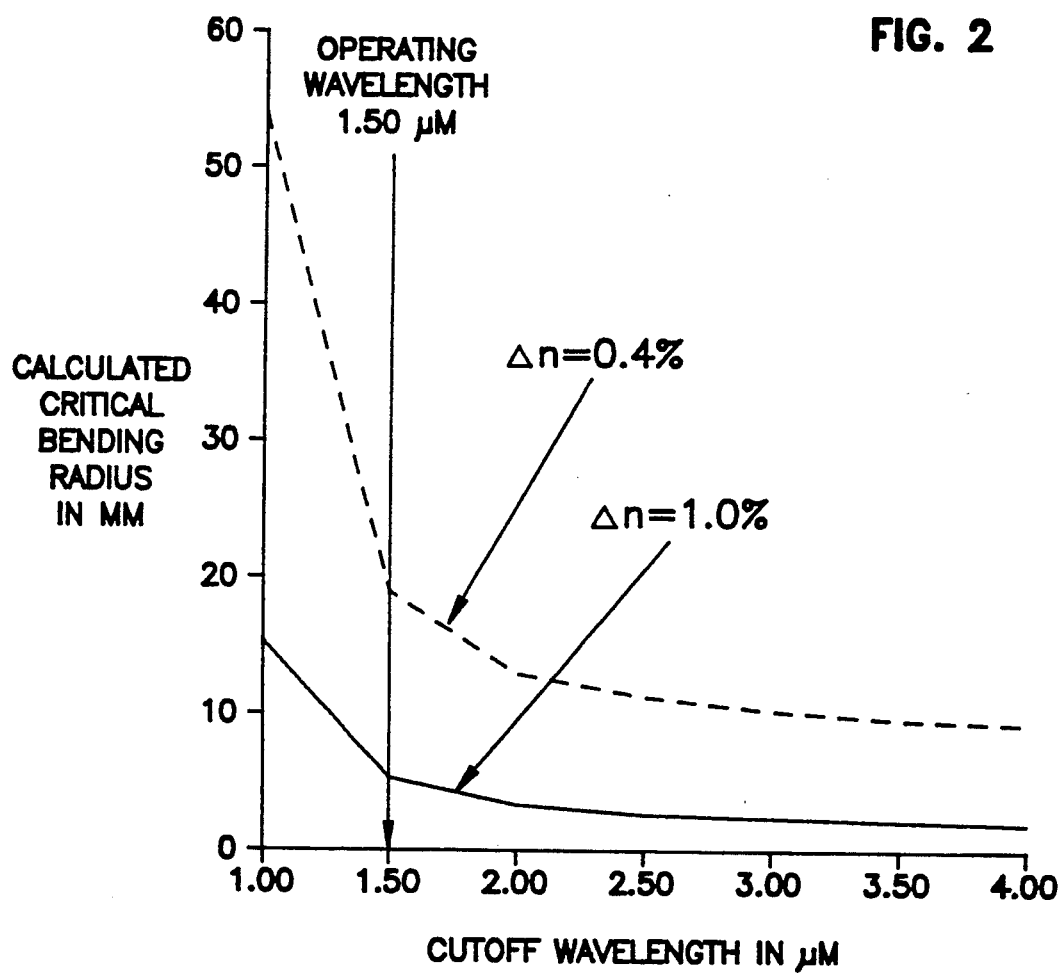
FIG. 2 is a chart of critical bending radius versus cutoff wavelength variations with index of diffraction difference in accordance with Equation (1)
Figure 3:
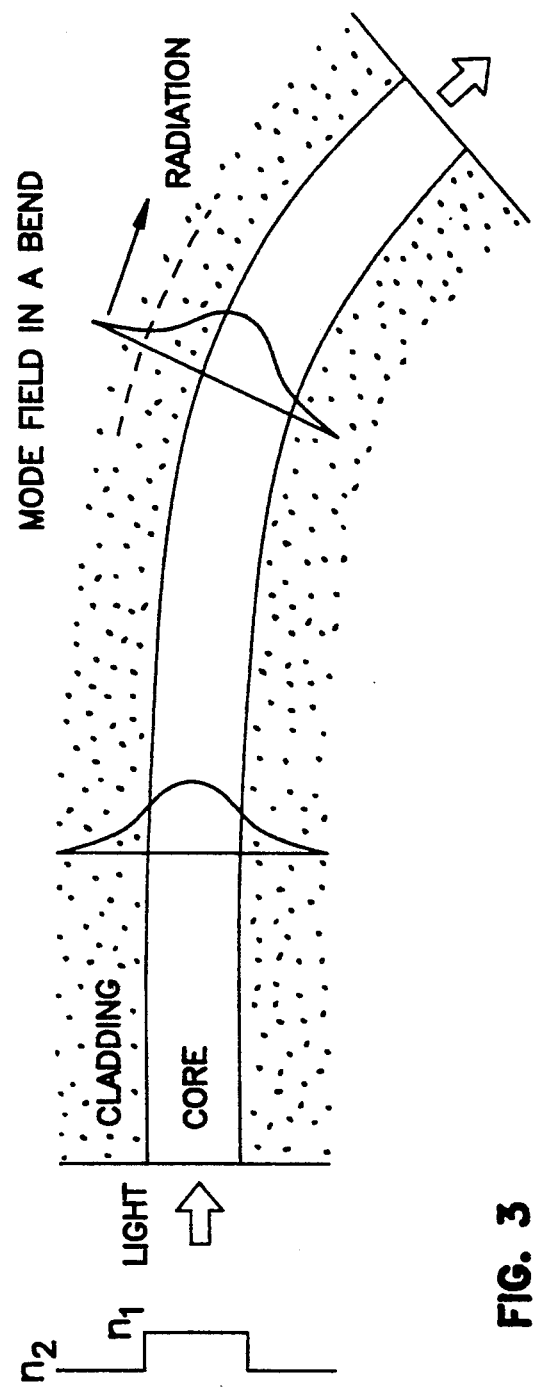
FIG. 3 is an idealized depiction of field distributions in a waveguide section that transitions from a straight to a curved path.

FIG. 2 shows how an increase in $\Delta n$, as in prior art systems, lowers the critical bending radius established by Equation (1). FIG. 3 depicts the manner in which field distribution within an optical waveguide is affected by the existence of a bend in the waveguide. With the core having an index of $n_2$ and the cladding having an index of $n_1$, and a step index variation being used as shown, the Gaussian field distribution concentrated in the core and terminating in the cladding is symmetrically distributed. When entering an arcuate region along the waveguide length, however, the field is skewed toward the outer diameter because of the unequal path lengths, and if the bend is sharp enough, energy is lost in outward radiation, as depicted generally. The usual solution, in the prior art, has been to increase the difference, $\Delta n$, in the indices of refraction between the core and cladding, as shown in FIG. 2, which according to the Equation (1) given above from the treatise by Jeunhomme, this in a substantial decrease in the critical bending radius. Under these conditions, however, the attenuation rises to approximately 0.30 db/km or more, in contrast to the 0.16 to 2.8 db/km attained with typical dopant levels for telecommunication grade fibers. When a high radius of curvature is introduced, however, such as at the peel point of a tethered vehicle payout bobbin, where the radius of curvature may be as low as 1.2 millimeters, the bending loss alone for telecommunication grade fibers is increased to 30 db. This renders waveguides of such fibers largely unacceptable for the application.

Figure 4:
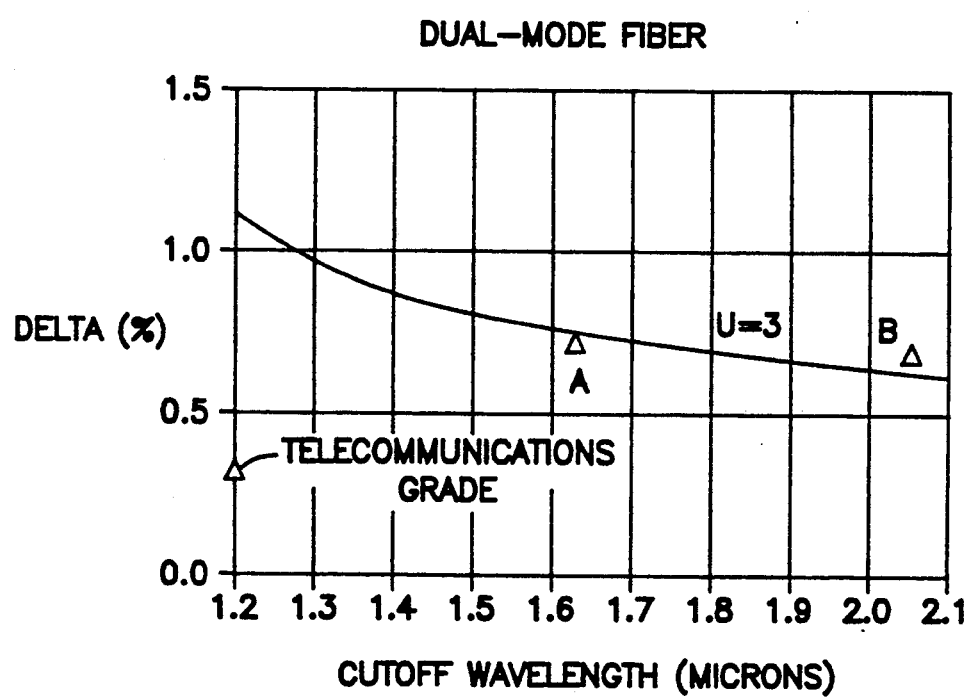
FIG. 4 is a chart of $\Delta n$ versus cutoff wavelength for two types of waveguides in accordance with the invention in comparison to present telecommunications grade waveguide.
Figure 5:
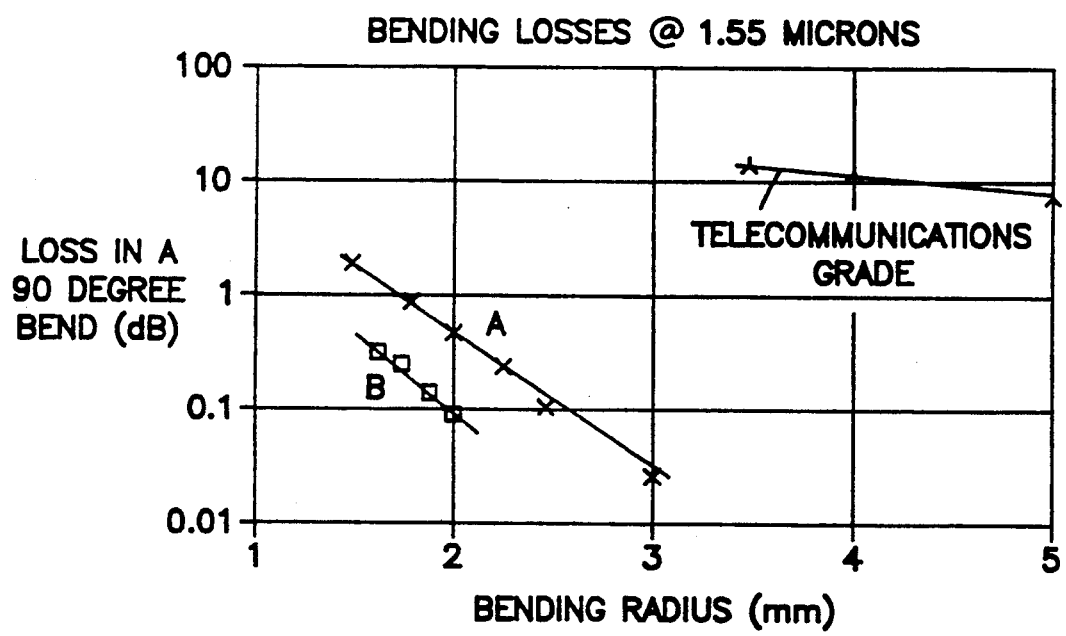
FIG. 5 is a chart of losses in a 90° bend versus bend radius for the optical waveguides referenced in FIG. 4.

FIG. 4 demonstrates how the virtual single mode transmission can be achieved with a high cutoff wavelength and a relatively low dopant level, as shown for two different waveguides, designated A and B. Whereas waveguide A has a $\Delta n$ of approximately 0.7% and a cutoff wavelength of about 1.63 micrometers, waveguide B has a $\Delta n$ of 0.65% and a cutoff wavelength of about 2.05 micrometers. In contrast, telecommunication grade waveguides with $\Delta$ of 1.55 micrometers have a cutoff wavelength of 1.2 micrometers and a $\Delta n$ of 0.35%. Bending losses at 1.55 micrometers for these different waveguide configurations are shown on a logarithmic scale in FIG. 5. Waveguide B, at a 2 mm bending radius, has only a 0.1 db loss for a 90° bend. Telecommunications grade waveguides have bending losses which are two orders of magnitude greater for substantially higher bending curvatures.

FIG. 6 shows, again on a logarithmic scale for attenuation, that the primary mode $LP_{01}$ has satisfactorily low attenuation, in the range of 0.16 to 0.25, for the selected 1.55 nanometer operating wavelength, while the second order mode $LP_{11}$, has an attenuation that is several orders of magnitude greater. Although the attenuation of the primary mode does vary with wavelength to some degree, the attenuation of the second order mode is far more erratic, although utilizing the principles of invention a desirable relationship can be established for any chosen operating wavelength.

Figure 7:
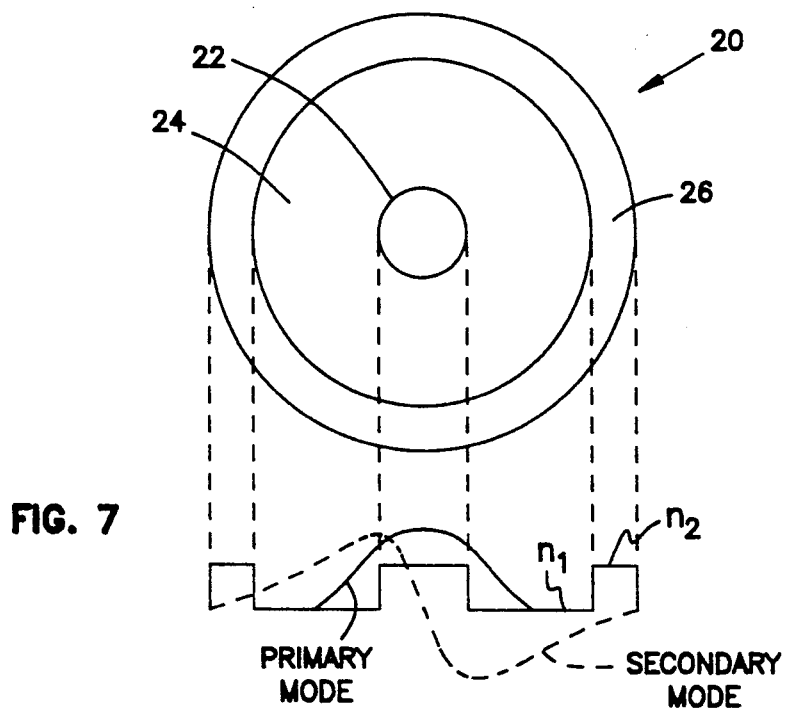
FIG. 7 is a diagram of refractive index variations throughout the diameter of a fiber that includes a step index variation in the cladding in accordance with the invention.

A modified approach to a dual mode waveguide configuration is shown in the diagram of FIG. 7, which illustrates index variations through the core 22 and cladding 24 of an optical waveguide 20. The outer region 26 of the cladding 24 also includes a higher index region 26 in a radial position to intercept the outer portion of the second order field. This discontinuity introduces even more attenuation into the second order mode without affecting the primary mode.

Figure 8:
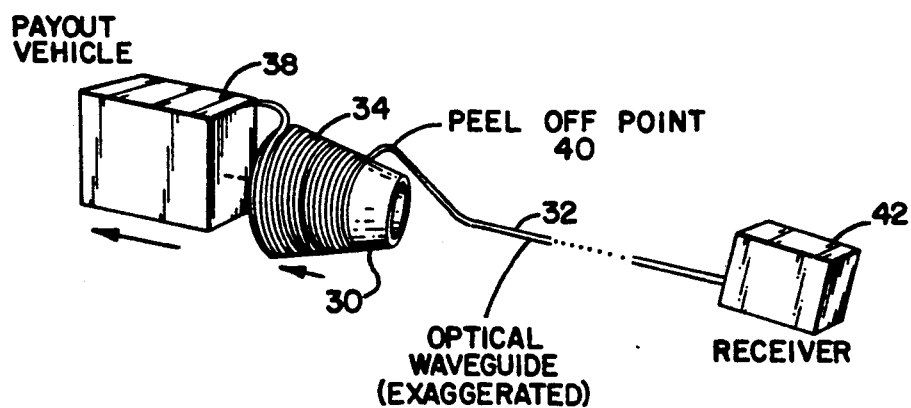
FIG. 8 is a block diagram of steps that may be used in a method accordance with the invention.

FIG. 8 illustrates in generalized fashion the usage of an optical waveguide in accordance with the invention in a tethered vehicle payout system. A tapered bobbin 30 has a central axis that is collinear with or substantially parallel to a payout axis along which optical waveguide 32 is to be fed. An optical waveguide 32 is wound on the bobbin 30 in multiple turns 34, with a thin layer of frangible binder (not shown in detail) holding the windings 34 together with a predetermined low level of binding or restraining force. The bobbin 30 is mounted on a movable vehicle 38 which is to move along the longitudinal axis relative to a receiver 42 to which the opposite end of the waveguide 32 is tethered. As the vehicle 38 moves, waveguide 32 is pulled off the waveguide turns 34 at a peel point 40 that introduces the sharpest radius along the waveguide length. The waveguide 32 is strong enough to strip free from the frangible binder attachment and to trail the vehicle 38. Communication between the payout vehicle 38 and the relatively stationary receiver 42 is constant.

A similar approach can be used to pay out cable from a bobbin or mandrel for other purposes as well. In the signal sensor type of system, the optical waveguide is wound on a mandrel and has a uniform but relatively small bending radius. Here both the pure bending losses and the micro-bending losses arising from variations in the windings must be compensated for in accordance with the invention.

Figure 9:
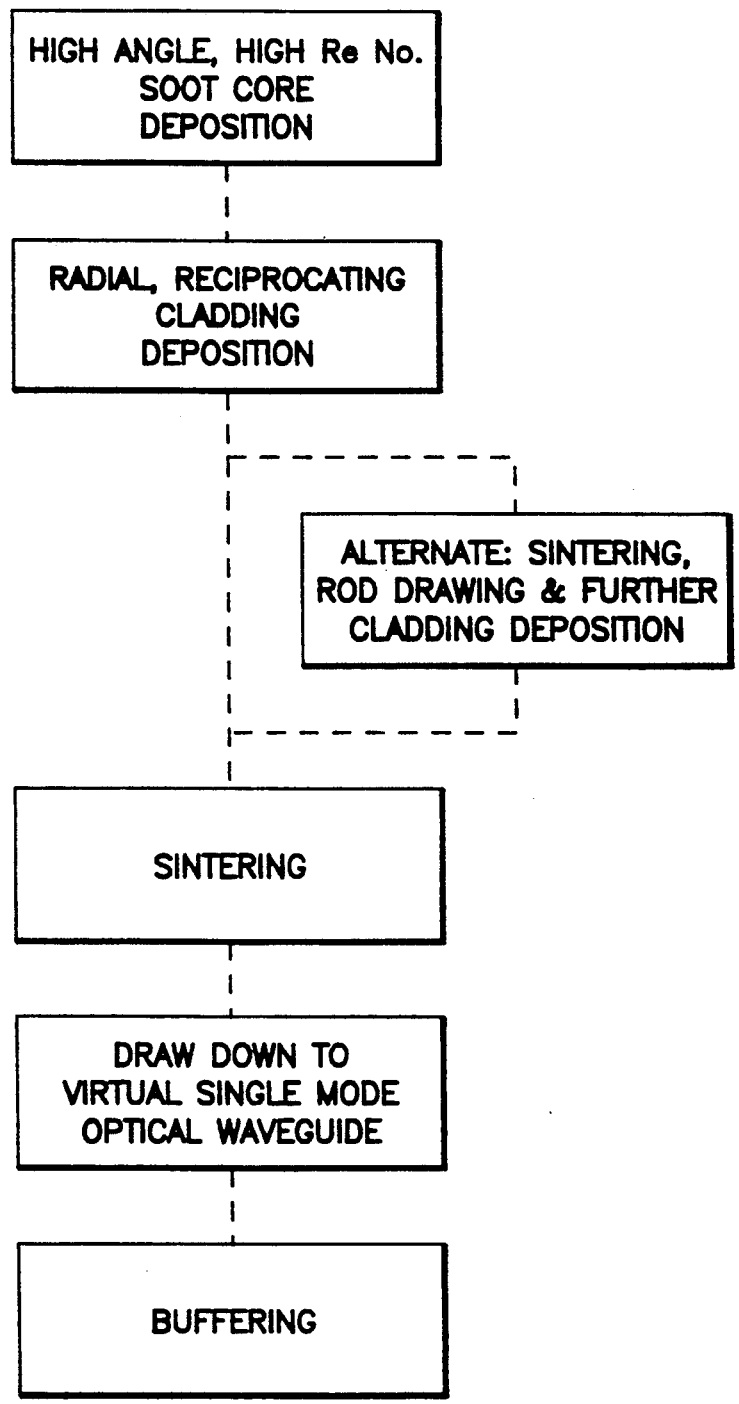
FIG. 9 is a simplified diagram of a tethered vehicle waveguide payout system, showing the manner in which a sharp bend is introduced during payout.

FIG. 9 depicts the principal steps involved in fabricating an optical waveguide in accordance with the invention. A soot preform is first fabricated having a core of predetermined initial size and with a given index of refraction. The core may be of pure silica, so that a fluorosilicate or other dopant can then be used in the deposition of the cladding soot layer, or the core may be doped to have the desired higher index of refraction relative to a pure silica cladding. Other combinations of core and cladding, apart from silica based systems, may also be used in accordance with known technology.

The deposition process is preferably one using axial buildup at a high angle and high Reynolds number for the core, followed by subsequent deposition of cladding with perpendicularly directed soot streams reciprocating along the length of the body, as described in co-pending patent application Ser. No. 308,986, filed Feb. 8, 1989, now U.S. Pat. No. 5,028,246, entitled Methods of Making Optical Waveguides And Waveguides Made Thereby, and assigned to the assignee of the present application. The technique described therein is particularly suitable for economic and controlled buildup of cores and cladding for preforms. In addition, the referenced patent application discloses the manner in which a desired dimensional relationship between core and cladding diameters may be established by successive steps of sintering an initially formed body and then adding further cladding to a desired final relationship.

Whether the preform is drawn directly into optical waveguides or intermediate steps are used to build up the desired thickness of cladding layer using one or more successive soot depositions, a following step is drawing the waveguide to final configuration. Then a buffering step is usually added, entailing coating or otherwise protecting the waveguide so as to increase strength and protect against abrasion. For optical waveguides having a 1.55 nanometer operating wavelength, for example, waveguides in accordance with the invention have an index differential $\Delta n$ of below 0.75%, and a cutoff wavelength of 1.6 to 2.1 mm, together with an overall waveguide diameter (core and cladding) of about 78 to 127 microns. In preferred examples in accordance with the invention, the value $\Delta n$ is 0.7%, the cutoff wavelength is 2.05 $\mu m$ and the waveguide diameter is 125 microns.

Finally, the optical waveguide formed in accordance with the invention is installed in a system with the waveguide total length being in excess of 9000 meters. Transmission attenuation and bending losses are then sufficient to reduce the second order mode to an acceptably low level.

Although there have been described above an illustrated in the drawings various modifications and variations in accordance with the invention, it will be appreciated that the invention is not limited thereto but includes all modes and variants in accordance with the scope of the appended claims.

What is claimed is:

1. An optical waveguide for applications in which the waveguide is to be subjected to physical bending that tends to introduce losses in transmission of electromagnetic wave energy centered at a given first wavelength, comprising:
    a multi-mode fiber having a cutoff wavelength at least 50 nanometers greater than the first wavelength, and including means for attenuating modes higher than the primary 2. An optical waveguide as set forth in claim 1 above, wherein the primary mode attenuation is less than 0.28 db/km.

3. An optical waveguide as set forth in claim 1 above, wherein the fiber is a dual mode fiber.

4. An optical waveguide as set forth in claim 1 above, wherein the difference $\Delta n$ index of refraction between core and cladding is less than about 0.75%.

5. An optical waveguide as set forth in claim 4 above, wherein the first wavelength is about 1.55 micrometers and the cutoff wavelength is about 2.05 micrometers, and wherein the optical waveguide diameter is in the range of 78 to 127 microns.

6. An optical waveguide as set forth in claim 3 above, wherein the means for attenuating modes higher than the primary mode in the fiber is an adequate length to attenuate the second mode such that the modal noise is within an acceptable range.

7. An optical waveguide as set forth in claim 1, wherein the means for attenuating higher order modes comprises dopant means defining a refractive index profile introducing attenuation in a radial region of the core outside the propagation zone of the primary mode.

8. An optical waveguide as set forth in claim 7 above, wherein the core/cladding refractive index profile is a stepped profile, having a central step in the core region of higher refractive index, and spaced apart steps of higher refractive index in the cladding region.

9. An optical waveguide as set forth in claim 1 above, wherein the fiber has a silica core containing dopant and a pure silica cladding.

10. An optical waveguide as set forth in claim 8 above, wherein the core has an index of refraction about 0.70% greater than the index of refraction of the cladding, and wherein the fiber diameter is about 125 microns.

11. An optical waveguide as set forth in claim 1 above, wherein the fiber has a pure silica core and a doped fluorosilicate cladding.

12. An optical waveguide having from approximately 0.16 to about 0.28 bb/km attenuation when used in transmission of light energy at 1.55 micrometers comprising:
    an optical waveguide fiber having a core cladding relationship in which the core has approximately 0.75% or less difference ($\Delta n$) in refractive index from the cladding, and wherein the core has a sufficient radial dimension to establish primary and second order modes of transmission in the waveguide, the fiber further including means to attenuate the second order modes within the transmissive length of the waveguide.

13. An optical waveguide as set forth in claim 12 above, wherein the fiber has a cutoff wavelength of approximately 2.05 micrometers and $\Delta n$ is approximately 0.70% and the fiber diameter is about 125 microns.

14. The method of making an optical waveguide having reduced band sensitivity and low attenuation, comprising the steps of:
    fabricating a soot preform having an internal core and an exterior cladding, the core having an index of refraction that differs from the cladding by less than 0.75%;
    drawing the preform down to a diameter of about 78 to 127 microns for propagating electromagnetic wave energy at the region of 1.55 micrometers; and
    extending the length of the fiber to a length adequate to attenuate higher order modes of transmission.

15. The method as set forth in claim 14 above, further including the step of lowering the refractive index in a portion of the cladding spaced apart from the core, further to attenuate higher order modes.

* * * * *

UNITED STATES PATENT AND TRADEMARK OFFICE
CERTIFICATE OF CORRECTION

PATENT NO. : 5,175,785                Page 1 of 2

DATED : December 29, 1992

INVENTOR(S) : Franklin W. Dabby

It is certified that error appears in the above-identified patent and that said Letters Patent is hereby corrected as shown below:

Column 2, line 2, delete "from" after the word --increase--.

Column 4, line 13, insert --in-- after the word --method--.

Column 4, line 40 twice "nm" should read --mm--.

Column 4, line 42, "30" should read --50--.

Column 4, line 43, insert --greater than the operating-- after the numeral "550nm".

Column 5, line 2, "i-" should read --in--.

Column 5, line 49, "in" should read --is--.

Column 6, line 18, insert --the-- after the word "of".

UNITED STATES PATENT AND TRADEMARK OFFICE
CERTIFICATE OF CORRECTION

PATENT NO. : 5,175,785

DATED : December 29, 1992

INVENTOR(S) : Franklin W. Dabby

It is certified that error appears in the above-identified patent and that said Letters Patent is hereby corrected as shown below:

Column 7, line 42 "an" should read --and--.

Column 8, line 33 "bb/km" should read --db/km--.

Signed and Sealed this

Sixteenth Day of November, 1993

Attest:

BRUCE LEHMAN

Attesting Officer

*Commissioner of Patents and Trademarks*